(12) United States Patent
Choi et al.

(10) Patent No.: US 11,394,225 B2
(45) Date of Patent: Jul. 19, 2022

(54) METHOD AND APPARATUS FOR CHANGING IMPEDANCE OF TERMINAL INCLUDED IN CONNECTOR

(71) Applicant: SAMSUNG ELECTRONICS CO., LTD., Suwon-si (KR)

(72) Inventors: Hang Seok Choi, Yongin-si (KR); Ku Chui Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 291 days.

(21) Appl. No.: 16/625,158

(22) PCT Filed: Jul. 13, 2018

(86) PCT No.: PCT/KR2018/007969
§ 371 (c)(1),
(2) Date: Dec. 20, 2019

(87) PCT Pub. No.: WO2019/039735
PCT Pub. Date: Feb. 28, 2019

(65) Prior Publication Data
US 2021/0336469 A1    Oct. 28, 2021

(30) Foreign Application Priority Data
Aug. 25, 2017 (KR) .......................... 10-2017-0108238

(51) Int. Cl.
*H02J 7/00* (2006.01)
*G05F 1/56* (2006.01)
(Continued)

(52) U.S. Cl.
CPC .......... *H02J 7/007188* (2020.01); *G05F 1/56* (2013.01); *G06F 1/26* (2013.01); *H01R 24/60* (2013.01); *H01R 2107/00* (2013.01)

(58) Field of Classification Search
CPC ........ H02J 7/007188; G05F 1/56; G06F 1/26; H01R 24/60; H01R 2107/00
See application file for complete search history.

(56) References Cited

U.S. PATENT DOCUMENTS 7,902,794 B2    3/2011    Ahmad et al.
9,312,644 B2    4/2016    Kao et al.
(Continued)

FOREIGN PATENT DOCUMENTS

CN    2389438    7/2000
CN    1680902    10/2005
(Continued)

OTHER PUBLICATIONS

International Search Report for PCT/KR2018/007969, dated Nov. 7, 2018, 4 pages.
(Continued)

*Primary Examiner* — Adolf D Berhane
*Assistant Examiner* — Afework S Demisse
(74) *Attorney, Agent, or Firm* — Nixon & Vanderhye, P.C.

(57) ABSTRACT

An electronic device includes a connector including a plurality of terminals for electrically connecting to a power supply device supplying a power to the electronic device and a control circuit. The control circuit senses a moisture entering the connector, changes an impedance of at least one specified data terminal among the terminals in response to the sensing of the moisture such that the power supply device identifies the impedance of the at least one specified data terminal and changes a level of a voltage depending on the impedance, and receives the voltage whose level is changed from the power supply device. Other various embodiments identified in the specification are also possible.

14 Claims, 8 Drawing Sheets

(51) Int. Cl.
  *G06F 1/26* (2006.01)
  *H01R 24/60* (2011.01)
  *H01R 107/00* (2006.01)

(56) References Cited

U.S. PATENT DOCUMENTS

| | | | |
|---|---|---|---|
| 9,860,659 B2 | 1/2018 | Won et al. | |
| 9,923,358 B2 | 3/2018 | Tao et al. | |
| 10,014,637 B2 | 7/2018 | Hasegawa et al. | |
| 2005/0218239 A1 | 10/2005 | Busch | |
| 2006/0058069 A1 | 3/2006 | Garcia et al. | |
| 2009/0009138 A1 | 1/2009 | Ahmad et al. | |
| 2015/0229119 A1* | 8/2015 | Tao | H02H 1/0007 361/91.1 |
| 2016/0013595 A1 | 1/2016 | Kao et al. | |
| 2016/0157033 A1 | 6/2016 | Won et al. | |
| 2017/0017598 A1 | 1/2017 | Chou et al. | |
| 2017/0110835 A1 | 4/2017 | Hasegawa et al. | |
| 2017/0358922 A1 | 12/2017 | Bacon et al. | |
| 2019/0173276 A1 | 6/2019 | Bacon et al. | |

FOREIGN PATENT DOCUMENTS

| | | | |
|---|---|---|---|
| CN | 105048201 | 11/2015 | |
| CN | 106598818 | 4/2017 | |
| CN | 106598818 A * | 4/2017 | ......... G06F 13/4081 |
| JP | 2012-222858 | 11/2012 | |
| JP | 2017-079048 | 4/2017 | |
| KR | 20-1997-0015388 | 4/1997 | |
| KR | 10-2005-0005925 | 1/2005 | |
| KR | 10-2005-0063530 | 6/2005 | |
| KR | 10-2008-0083726 | 9/2008 | |
| KR | 10-2009-0004525 | 1/2009 | |
| KR | 10-0965798 | 6/2010 | |
| KR | 10-2016-0064842 | 6/2016 | |
| KR | 20-0480870 | 7/2016 | |
| WO | 2017/213796 | 12/2017 | |

OTHER PUBLICATIONS

Written Opinion of the ISA for PCT/KR2018/007969, dated Nov. 7, 2018, 6 pages.
Notification of Reason for Refusal dated Oct. 8, 2021 in Korean Patent Application No. 10-2017-0108238 and English-language translation.
First Office Action dated Dec. 30, 2020 in counterpart Chinese Patent Application No. 201880043879.4 and English-language translation.
Extended Search Report dated Jun. 16, 2020 in counterpart European Patent Application No. 18847579.2.

* cited by examiner

METHOD AND APPARATUS FOR CHANGING IMPEDANCE OF TERMINAL INCLUDED IN CONNECTOR

FIELD

The present disclosure relates to a method and apparatus for changing an impedance of a terminal included in a connector.

DESCRIPTION OF RELATED

A mobile electronic device, such as a smartphone, includes a connector to receive power and signals from an outside thereof or to transmit signals to the outside. In addition, a power supply device, such as a travel adapter (TA), requires a connector to supply the power to an external device.

The above information is presented as background information only to assist with an understanding of the present disclosure. No determination has been made, and no assertion is made, as to whether any of the above might be applicable as prior art with regard to the present disclosure.

SUMMARY

Since the connector is exposed to the outside as a part of the exterior of the electronic device, there is a possibility that a foreign matter such as water enters into the connector. When the water enters into the connector, a metal terminal (e.g., a metal pin) included in the connector is corroded by a current flowing through the connector.

Aspects of the present disclosure are to address at least the above-mentioned problems and/or disadvantages and to provide at least the advantages described below. Accordingly, an aspect of the present disclosure is to provide an electronic device including a connector, which is capable of controlling a power supplied through the connector to prevent the connector from being corroded when moisture is sensed in the connector.

In accordance with an aspect of the present disclosure, an electronic device includes a connector including a plurality of terminals for electrically connecting to a power supply device supplying a power to the electronic device and a control circuit. The control circuit senses a moisture entering the connector, changes an impedance of at least one specified data terminal among the terminals in response to the sensing of the moisture such that the power supply device identifies the impedance of the at least one specified data terminal and changes a level of a voltage depending on the impedance, and receives the voltage whose level is changed from the power supply device.

According to various embodiments of the present disclosure, an electronic device includes a power supply circuit, a connector including a plurality of terminals for electrically connecting to an external electronic device to supply a power to the external electronic device from the electronic device, and a control circuit. The control circuit measures an impedance corresponding to a second data terminal among the terminals when a voltage across a first data terminal among the terminals is changed from a first voltage to a second voltage and controls the power supplied to a power supply terminal among the terminals from the power supply circuit when the impedance satisfies a specified condition.

According to various embodiments of the present disclosure, a method for changing an impedance of a terminal included in a connector of an electronic device including the connector with a plurality of terminals includes measuring the impedance corresponding to a second data terminal among the terminals when a voltage across a first data terminal among the terminals is changed from a first voltage to a second voltage and controlling a power supplied to a power supply terminal among the terminals from a power supply circuit included in the electronic device when the impedance satisfies a specified condition.

According to embodiments disclosed in the present disclosure, the connector may be prevented from being corroded due to the moisture entering therein, and thus a life expectancy of the connector may be prevented from decreasing.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

With reference to the drawings, the same or similar components may be designated by the same or similar reference numerals.

DETAILED DESCRIPTION OF EXAMPLE EMBODIMENTS

Figure 1:
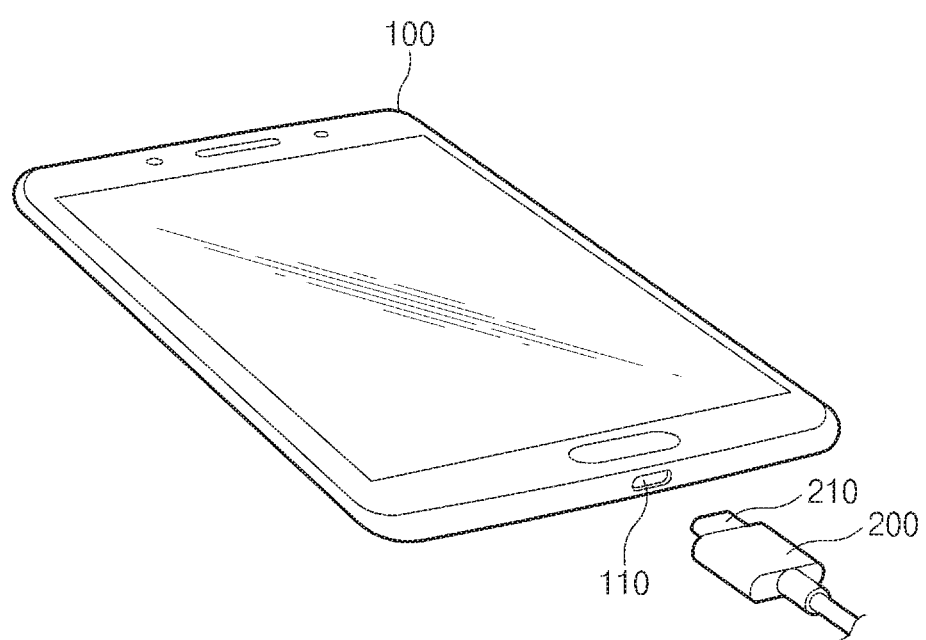
FIG. 1 is a perspective view showing an electronic device including a connector according to an embodiment.

FIG. 1 is a perspective view showing an electronic device including a connector according to an embodiment.

Referring to FIG. 1, a mobile electronic device 100, such as a smartphone, may include a first connector 110 to receive a power and a signal from an outside thereof or to transmit a signal to the outside. The first connector 110 may be referred to as "receptacle", "input/output port (I/O port)", or the like. According to an embodiment, the first connector 110 may be a USB type-C (universal serial bus type-C) connector. However, it should not be limited thereto or thereby. That is, the first connector 110 may be a connector according to various standards. For example, the first connector 110 may be a USB type-A or USB type-B.

A power supply device (or a charging device) 200, such as a travel adapter, may include a second connector 210 to supply the power to an external device (e.g., the mobile electronic device 100). The second connector 210 may be referred to as "plug". The second connector 210, for example, may be provided on one side of a cable for connection to the external device. According to various embodiments, the second connector 210 may form a part of various types of electronic accessories.

The first connector 110 and the second connector 210 may have a structure and a shape that allow the first connector 110 and the second connector 210 to be physically coupled to each other. When the first connector 110 and the second connector 210 are physically coupled to each other, the first connector 110 and the second connector 210 may be electrically connected to each other. In this case, a data communication or a power transfer between the mobile electronic device 100 including the first connector 110 and the power supply device 200 including the second connector 210 may be possible.

Figure 2:
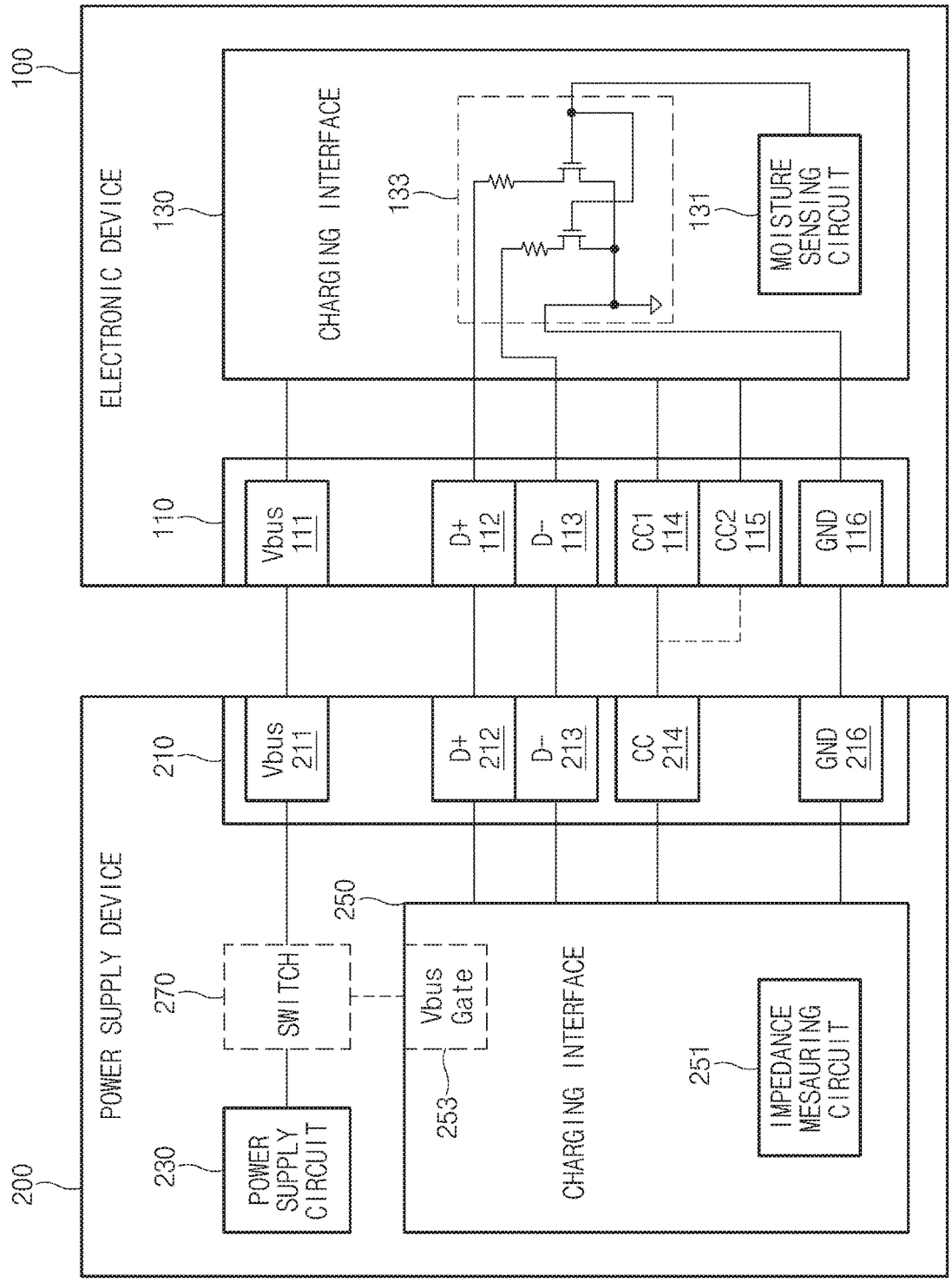
FIG. 2 is a block diagram showing an electronic device including a connector according to an embodiment.

FIG. 2 is a block diagram showing the electronic device including the connector according to an embodiment.

Referring to FIG. 2, the electronic device 100 (e.g., the mobile electronic device) may include the first connector 110 to connect to the power supply device 200 (e.g., the travel adapter (TA)) and a first charging interface 130. According to various embodiments, the electronic device 100 may further include components, such as a display, a communication circuit and various sensors, which are not shown in figures.

The first connector 110 may include a plurality of pins (e.g., terminals) for electrical coupling with the second connector 210 included in the power supply device 200. The pins may include, for example, a bus power pin (Vbus pin) 111 for supplying the power, a D+ pin 112 and a D− pin 113 for transmitting and receiving data, a CC1 pin 114 and a CC2 pin 115 for exchanging set information with the external device, and a ground pin (GND pin) 116. Although not shown in figures, the pins may further include, for example, a data bus pin (TX+ pin and TX− pin) for providing a high-speed data transmission path, a data bus pin (RX+ pin and RX− pin) for providing a high-speed data reception path, or a sideband use pin (SBU1 pin and SBU2 pin).

According to an embodiment, the first connector 110 may be the USB type-C connector, and the pins may be arranged such that twelve pins on both sides of a mid plate are point-symmetrical with each other. Accordingly, the first connector 110 may be coupled to the second connector 210 regardless of an orientation in which it is inserted into the second connector 210 without affecting a function of each pin.

According to an embodiment, the first charging interface 130 may include a charger integrated circuit (charger IC). The first charging interface 130 may support a wired and/or wireless charging scheme. According to an embodiment, the first charging interface 130 may include a moisture sensing circuit 131. According to another embodiment, the moisture sensing circuit 131 may be provided separately from the first charging interface 130.

The moisture sensing circuit 131 may include a circuit that determines whether moisture enters into the first connector 110. When it is determined that the moisture enters into the first connector 110 through the moisture sensing circuit 131, the first charging interface 130 may pull down an impedance of a designated data terminal (e.g., the D+ pin 112 and/or the D− pin 113) among the data terminals 112 and 113 below a specified value (e.g., about 10 ohm) using an impedance pull-down circuit 133.

The power supply device 200 may include the second connector 210 for connecting to the electronic device 100, a power supply circuit 230, and a second charging interface 250. According to another embodiment, the power supply device 200 may further include a switch 270 and a Vbus gate 253 controlling an operation of the switch 270. According to various embodiments, the power supply device 200 may further include, for example, components, such as a third charging interface and a second switch, which are not shown in figures.

According to an embodiment, the second connector 210 may be connected to the first connector 110 of the electronic device 100. According to an embodiment, the second connector 210 may be the USB type-C connector. The USB type-C connector may be structurally divided into a first part and a second part, and the first part may have a structure symmetrical with that of the second part. Accordingly, the USB type-C connector may be connected regardless of its orientation when the connectors are connected to each other. According to an embodiment, a plurality of pins (e.g., terminals) of the second connector 210 may make contact with the pins of the first connector 110 included in the electronic device 100 to form a path through which signals are transmitted or received.

The second connector 210 may include the pins for electrical coupling with the first connector 110 included in the electronic device 100. The pins may include, for example, a Vbus pin 211 (or power supply terminal) connected to the Vbus pin 111 of the electronic device 100, a D+ pin 212 connected to the D+ pin 112, a D− pin 213 connected to the D− pin 113, a CC pin 214 connected to the CC1 pin 114 or the CC2 pin 115, and a GND pin 216 connected to the GND pin 116. Although not shown in figures, the pins may further include, for example, a TX+ pin, a TX− pin, an RX+ pin, an RX− pin, an SBU1 pin, and an SBU2 pin, which are respectively connected to the TX+ pin, the TX− pin, the RX+ pin, the RX− pin, the SBU1 pin, and the SBU2 pin of the electronic device 100.

According to an embodiment, the second connector 210 may be electrically connected to an external power source and may receive the power from the external power source. For example, the second connector 210 may be connected to an external electrical outlet to receive the power.

The power supply circuit 230 may transmit the power received from the electrical outlet (or internal battery) to the electronic device 100 through the Vbus pin 211 of the second connector 210. The power supply circuit 230 may include a pulse width modulation (PWM) module, an AC-to-DC converter, and a synchronous rectifier. The PWM module may control a voltage of the power received from the electrical outlet (or internal battery) by modulating a width of a pulse. According to an embodiment, the AC-to-DC converter may convert an alternating current received from the electrical outlet to a direct current. According to an embodiment, the synchronous rectifier may convert a low voltage direct current signal to a high voltage direct current signal to improve a charging efficiency. According to an embodiment, the power supply circuit 230 may change a charging voltage or a charging current in response to a control of the second charging interface 250.

According to an embodiment, the second charging interface 250 may communicate with the electronic device 100 in accordance with a first protocol. According to an embodiment, the first protocol may include a communication protocol using the D+ pin 212 or the D− pin 213 of the second connector 210. For example, the first protocol may include an adaptive fast charge (AFC) protocol or a quick charge (QC) protocol.

According to an embodiment, when the second connector 210 is connected to the first connector 110 of the electronic device 100, the second charging interface 250 may transmit and receive information in accordance with the first protocol using the D+ pin 212 or the D− pin 213 of the second connector 210 and may recognize that the electronic device 100 is connected. For instance, when the second connector 210 is connected to the first connector 110 of the electronic device 100, the second charging interface 250 may perform an operation according to a USB battery charging specification revision 1.2 (USB BC 1.2). The power supply device 200 and the electronic device 100 may identify information and support functions of each other when the operation in accordance with the USB BC 1.2 is performed.

According to an embodiment, when the D+ pin 212 and the D− pin 213 of the second connector 210 are changed from a short-circuited state to an open state after the operation according to the USB BC 1.2, the second charging interface 250 may perform the operation for the AFC or QC charge. For example, the second charging interface 250 may change a path through which the power is supplied to the D+ pin 212 and the D− pin 213 of the second connector 210 from a blocked state to a connected state to change the short-circuited state of the D+ pin 212 and the D− pin 213 to the open state, and when the D+ pin 112 and the D− pin 113 of the first connector 110 are opened, the electronic device 100 may recognize that the power supply device 200 supports the AFC charge.

According to an embodiment, the second charging interface 250 may transmit a first voltage/current list supported by the AFC or QC and stored in the internal memory to the electronic device 100 through the D+ pin 212 or the D− pin 213 of the second connector 210 in accordance with the first protocol. According to an embodiment, the second charging interface 250 may receive charge request information through the D+ pin 212 or the D− pin 213 of the second connector 210 from the electronic device 100 in accordance with the first protocol. The charge request information may include, for example, information about the charging voltage or the charging current demanded by the electronic device 100. When performing the charging operation in accordance with the first protocol, the electronic device 100 may select the charging voltage or the charging current based on the first voltage/current list. According to an embodiment, the second charging interface 250 may change the charging voltage or the charging current of the power supply circuit 230 based on the charge request information received from the electronic device 100.

According to an embodiment, the second charging interface 250 may communicate with the electronic device 100 in accordance with a second protocol. According to an embodiment, the second protocol may include a communication protocol using the CC pin 214 of the second connector 210. For instance, the second protocol may include a USB power delivery (USB PD) protocol.

According to an embodiment, when the second connector 210 is connected to the first connector 110 of the electronic device 100, the second charging interface 250 may transmit and receive information according to the second protocol using the CC pin 214 of the second connector 210 and may recognize that the electric device 100 is connected. For example, the second charging interface 250 may recognize that the electric device 100 is connected when a voltage across the pull-down impedance of the CC pin 214 of the second connector 210 is changed from a first voltage to a second voltage (e.g., from about 5 volts to about 2 volts). The electronic device 100 may recognize that the power supply device 200 is connected when a voltage across the pull-down impedance of the CC1 pin 114 or the CC2 pin 115 of the first connector 110 is changed from a third voltage to the second voltage (e.g., from about 0 volts to about 2 volts). When the power supply device 200 and the electronic device 100 are connected, the second connector 210 of the power supply device 200 may serve as a host (e.g., downstream facing port (DFP)), and the first connector 110 of the electronic device 100 may serve as a device (or "slave") (e.g., upstream facing port (UFP)).

According to an embodiment, the second charging interface 250 may transmit a second voltage/current list supported by the USB PD and stored in the internal memory to the electronic device 100 through the CC pin 214 of the second connector 210 in accordance with the second protocol. According to an embodiment, the second charging interface 250 may receive charge request information through the CC pin 214 of the second connector 210 from the electronic device 100 in accordance with the second protocol. The charge request information may include, for example, information about the charging voltage or the charging current demanded by the electronic device 100. When performing the charging operation in accordance with the second protocol, the electronic device 100 may select the charging voltage or the charging current based on the second voltage/current list.

According to an embodiment, the switch 270 may be placed between the power supply circuit 230 and the Vbus pin 211 of the second connector 210. According to an embodiment, the switch 270 may turn on/off the power supplied to the Vbus pin 211 of the second connector 210 by the power supply circuit 230 in response to the control of the second charging interface 250. According to an embodiment, the second charging interface 250 may turn off the switch 270 in a state in which the first connector 110 of the electronic device 100 is not connected to the second connector 210. According to an embodiment, the second charging interface 250 may turn on the switch 270 when the first connector 110 of the electronic device 100 is connected to the second connector 210.

According to an embodiment, the second charging interface 250 may include an impedance measuring circuit 251. The impedance measuring circuit 251 may measure an impedance of the D− pin 213 of the second connector 210. According to an embodiment, when a voltage across the D+ pin 212 of the second connector 210 decreases below a specified voltage (e.g., about 0.3 volts), the second charging interface 250 may measure the impedance of the D− pin 213 of the second connector 210 through the impedance measuring circuit 251. For instance, the impedance measuring circuit 251 may apply a current to the D− pin 213 of the second connector 210 to identify a voltage variation width, and thus the impedance measuring circuit 251 may measure the impedance. In this case, when the sensed impedance is equal to or smaller than a specified value (e.g., about 300 ohm), the second charging interface 250 may control the power supplied to the Vbus pin 211 of the second connector 210 from the power supply circuit 230 using the switch 270. That is, when the moisture enters the first connector 110 of the electronic device 100 and the impedance of the D+ pin 112 and/or the D− pin 113 of the first connector 110 is pulled down below the specified value (e.g., about 10 ohm), the second charging interface 250 of the power supply device 200 may identify that the voltage across the D+ pin 212 of the second connector 210 decreases below the specified voltage (e.g., about 0.3 volts) and may measure the impedance of the D− pin 213 of the second connector 210 through the impedance measuring circuit 251. In this case, when the impedance of the D− pin 213 of the second connector 210 is equal to or smaller than the specified value (e.g., about 300 ohm), the second charging interface 250 may control the power supplied to the Vbus pin 211 from the power supply circuit 230 using the switch 270.

According to an embodiment, when the impedance of the D− pin 213 of the second connector 210 is equal to or smaller than the specified value (e.g., about 300 ohm), the second charging interface 250 may automatically restart the power supply circuit 230. For instance, the second charging interface 250 may operate the power supply circuit 230 in a smart hiccup mode. During the smart hiccup mode, the power supply circuit 230 may restart its power supply function at specified time intervals (e.g., about 2 seconds). For instance, the power supply circuit 230 may repeatedly perform an operation supplying the power to the Vbus pin 211 during a first time period (e.g., about 30 ms to about 60 ms) and an operation not supplying the power to the Vbus pin 211 during a second time period (e.g., about 2 seconds). In addition, the second charging interface 250 may measure the impedance of the D− pin 213 of the second connector 210 using the impedance measuring circuit 251 during the first time period and may automatically restart the power supply circuit 230 until the impedance becomes normal. That is, the second charging interface 250 may maintain the smart hiccup mode until the impedance becomes normal.

According to an embodiment, when the impedance of the D− pin 213 of the second connector 210 is equal to or smaller than the specified value (e.g., about 300 ohm), the second charging interface 250 may turn off the switch 270 to block the power supplied to the first connector 110 of the electronic device 100. For instance, the second charging interface 250 may turn off the switch 270 through the Vbus gate 253 such that the power supply circuit 230 is not connected to the Vbus pin 211, and thus the power supplied to the first connector 110 of the electronic device 100 may be blocked.

As described above, according to various embodiments, an electronic device (e.g., the electronic device 100) may include a connector (e.g., the first connector 110) including a plurality of terminals for electrically connecting to a power supply device (e.g., the power supply device 200) supplying a power to the electronic device, and a control circuit (e.g., the first charging interface 130), and the control circuit may be configured to sense the moisture entering the connector, change an impedance of at least one specified data terminal in response to the sensing of the moisture such that the power supply device identifies the impedance of the at least one specified data terminal (e.g., the D+ pin 112 and/or the D− pin 113) among the terminals and changes a level of a voltage depending on the impedance, and receive the voltage whose level is changed from the power supply device.

According to various embodiments, the control circuit may be configured to pull down the impedance of the at least one specified data terminal below a specified value in response to the sensing of the moisture.

According to various embodiments, the specified value may be about 10 ohm.

According to various embodiments, the control circuit may be configured to sense the moisture entering the connector after a specified time period and change the impedance of the at least one specified data terminal to a previous state when the moisture is not sensed.

As described above, according to various embodiments, an electronic device (e.g., the power supply device 200) may include a power supply circuit (e.g., the power supply circuit 230), a connector (e.g., the second connector 210) including a plurality of terminals for electrically connecting to an external electronic device to supply a power to the external electronic device from the electronic device, and a control circuit (e.g., the second charging interface 250), and the control circuit may be configured to measure an impedance corresponding to a second data terminal (e.g., the D− pin 213) among the terminals when a voltage across a first data terminal (e.g., D+ pin 212) among the terminals is changed from a first voltage to a second voltage and to control the power supplied to a power supply terminal (e.g., the Vbus pin 211) among the terminals from the power supply circuit when the impedance satisfies a specified condition.

According to various embodiments, the control circuit may be configured to determine that the impedance satisfies the specified condition when the impedance is equal to or smaller than the specified value.

According to various embodiments, the control circuit may be configured to restart the power supply circuit at specified time intervals when the impedance satisfies the specified condition.

According to various embodiments, the control circuit may be configured to remeasure the impedance corresponding to the second data terminal at the specified time period.

According to various embodiments, the control circuit may be configured to allow the power supply circuit to supply the power to the power supply terminal when the remeasured impedance does not satisfy the specified condition.

According to various embodiments, the electronic device may further include a switch (e.g., the switch 270) placed between the power supply circuit and the power supply terminal, and the control circuit may be configured to turn off the switch such that a connection between the power supply circuit and the power supply terminal is released when the impedance satisfies the specified condition.

According to various embodiments, the control circuit may be configured to remeasure the impedance corresponding to the second data terminal among the terminals when the voltage across the first data terminal among the terminals is changed to the first voltage after the switch is turned off.

According to various embodiments, the control circuit may be configured to turn on the switch such that the power supply circuit is connected to the power supply terminal when the remeasured impedance does not satisfy the specified condition.

Figure 3:
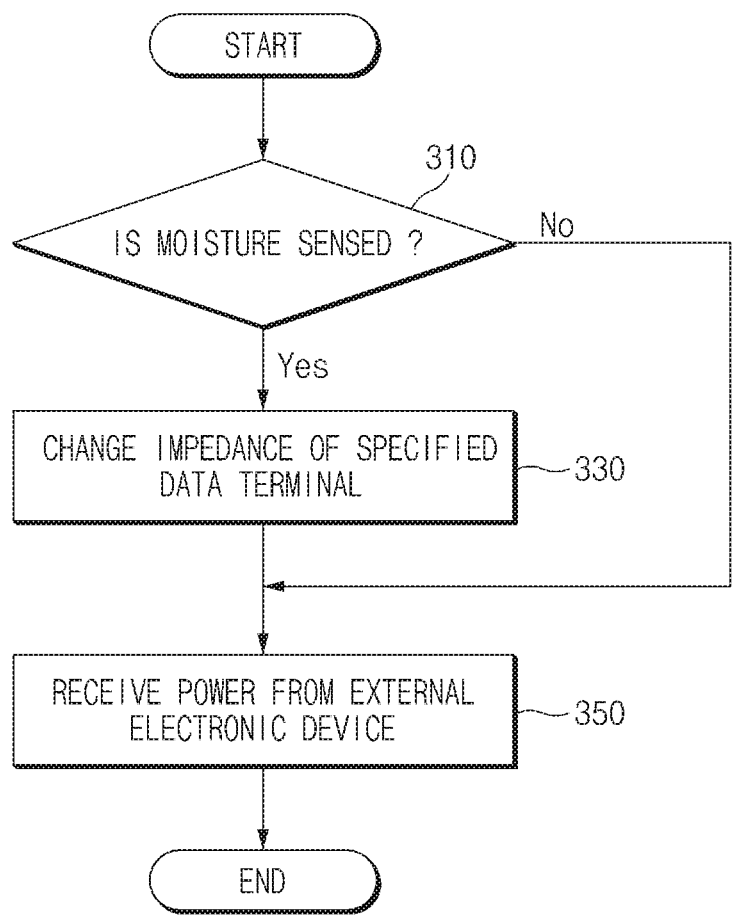
FIG. 3 is a flowchart showing an operation method of an electronic device to control a power received from an external electronic device according to an embodiment.

FIG. 3 is a flowchart showing an operation method of an electronic device to control a power received from an external electronic device according to an embodiment.

Referring to FIG. 3, in operation 310, the electronic device (e.g., the electronic device 100) may determine whether the moisture enters the connector (e.g., the first connector 110). That is, the electronic device may determine whether the moisture enters the connector. According to an embodiment, the electronic device may determine whether the moisture enters the connector using the moisture sensing circuit (e.g., the moisture sensing circuit 131) included in the electronic device.

When the moisture is sensed, the electronic device (e.g., the first charging interface 130) may change the impedance of the specified data terminal included in the connector in operation 330. According to an embodiment, when it is determined that the moisture enters the connector through the moisture sensing circuit, the electronic device may pull down the impedance of the specified data terminal (e.g., the D+ pin 112 and/or the D– pin 113) among the data terminals (e.g., the D+ pin 112 and the D– pin 113) included in the connector below the specified value (e.g., about 10 ohm).

In operation 350, the electronic device (e.g., the first charging interface 130) may receive the power from the external electronic device (e.g., the power supply device 200) after operation 330 or when the moisture is not sensed. The power provided from the external electronic device in the state in which the impedance of the specified data terminal is pulled down due to the sensing of the moisture may have a level enough to prevent the connector from being corroded when the current flows through the connector while there is the moisture in the connector. The received power may have a magnitude of the power corresponding to a voltage lower than a decomposition starting voltage (e.g., about 1.5 volts to about 2 volts).

Figure 4:
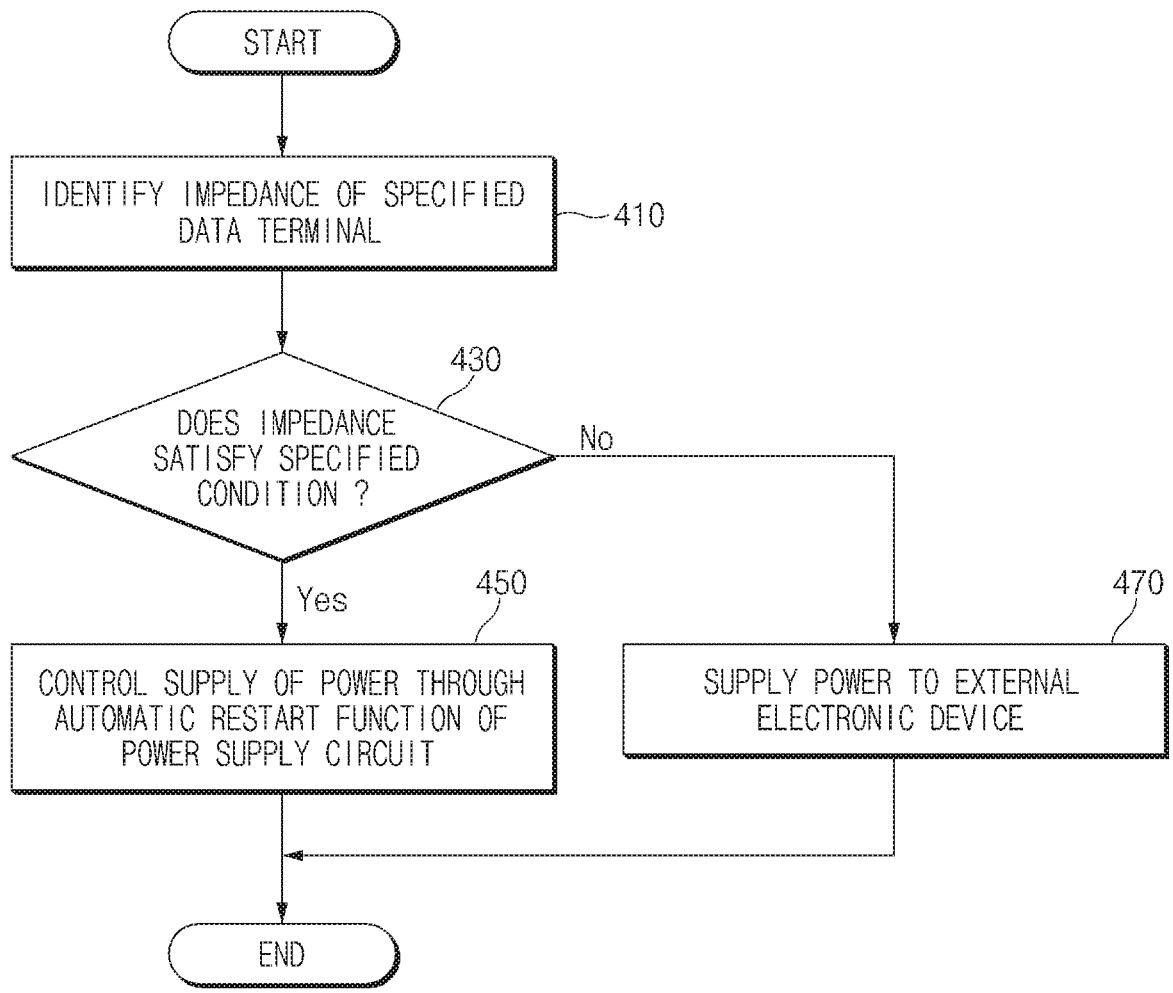
FIG. 4 is a flowchart showing an operation method of an electronic device to control a power supplied to an external electronic device according to an embodiment.
Figure 5:
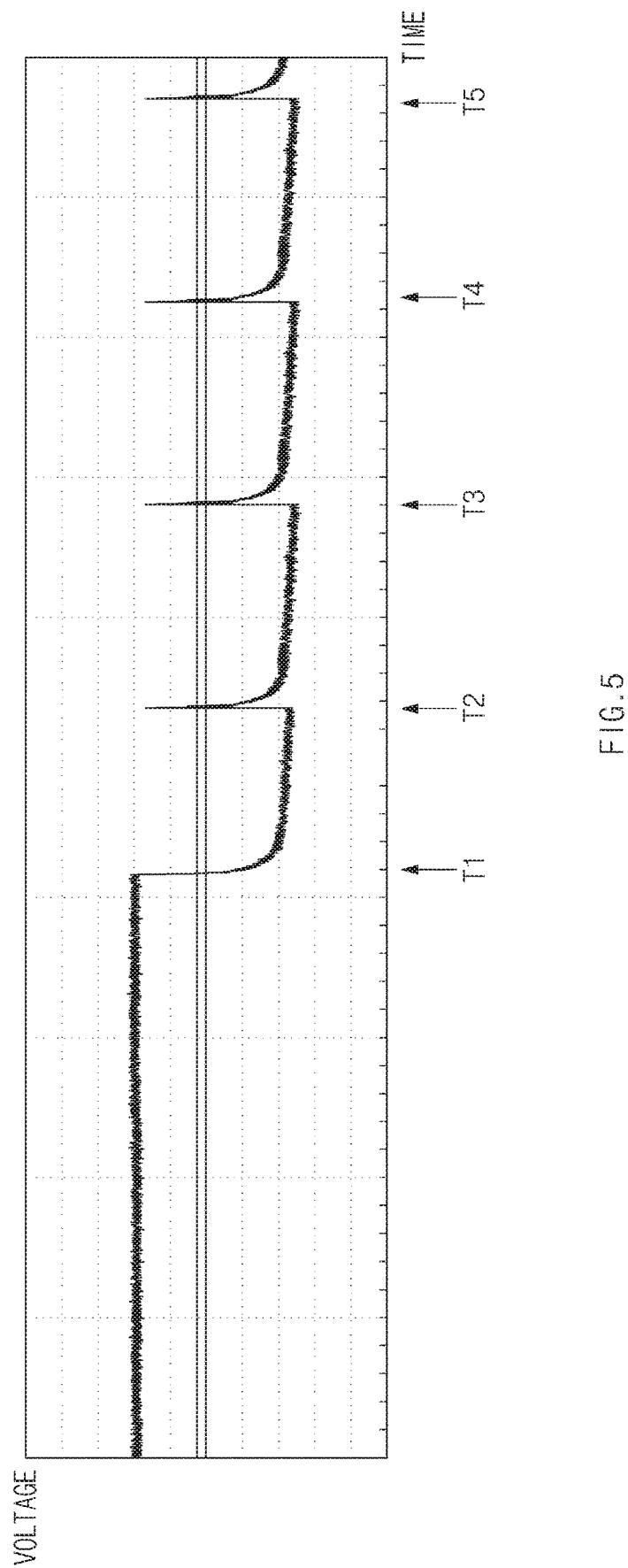
FIG. 5 is a graph showing a variation of a voltage due to a control of a power supplied to an external electronic device according to an embodiment.

FIG. 4 is a flowchart showing an operation method of an electronic device to control a power supplied to an external electronic device according to an embodiment, and FIG. 5 is a graph showing a variation of a voltage due to a control of a power supplied to an external electronic device according to an embodiment.

Referring to FIGS. 4 and 5, when the voltage across the first data terminal (e.g., the D+ pin 212) of the connector (e.g., the second connector 210) is equal to or smaller than the specified level (e.g., about 0.3 volts), the electronic device (e.g., the power supply device 200) may identify the impedance of the specified data terminal (e.g., the D– pin 213) in operation 410. As an example, when the voltage across the first data terminal (e.g., the D+ pin 212) is equal to or smaller than the specified level, the charging interface (e.g., the second charging interface 250) of the electronic device may measure the impedance of the second data terminal (e.g., the D-pin 213) through the impedance measuring circuit (e.g., the impedance measuring circuit 251) included in the electronic device.

In operation 430, the electronic device (e.g., the second charging interface 250) may determine whether the impedance of the specified data terminal satisfies the specified condition. As an example, the electronic device may determine whether the impedance is equal to or smaller than the specified value (e.g., about 300 ohm).

When the impedance satisfies the specified condition (e.g., when the impedance is equal to or smaller than the specified value), the electronic device (e.g., the second charging interface 250) may control the power supplied to the external device (e.g., the electronic device 100) using the automatic restart function of the power supply circuit (e.g., the power supply circuit 230) in operation 450. For instance, the power supply circuit may restart its power supply function at the specified time intervals (e.g., about 2 seconds). For instance, the power supply circuit may repeatedly perform the operation supplying the power to the Vbus pin (e.g., the Vbus pin 211) during the first time period (e.g., about 30 ms to about 60 ms) and the operation not supplying the power to the Vbus pin during the second time period (e.g., about 2 seconds). In addition, the charging interface may remeasure the impedance of the second data terminal of the connector using the impedance measuring circuit during the first time period and may automatically restart the power supply circuit until the impedance becomes normal.

FIG. 5 shows a graph showing the variation of the voltage due to the control of the power supplied to the external electronic device (e.g., the electronic device 100) when the power supply circuit operates in the automatic restart function (e.g., the smart hiccup mode). Referring to FIG. 5, when the impedance of the second data terminal of the connector is equal to or smaller than the specified value, the charging interface may automatically restart the power supply circuit to control the charge voltage to the external electronic device. Then, the charging interface may remeasure the impedance of the second data terminal in order to provide a normal charging function. For example, the charging interface may measure the impedance of the second data terminal of the connector through the impedance measuring circuit at the specified time intervals. When the remeasured impedance is not normal, the power supply circuit may be automatically restarted. The automatic restart function may be repeated until the impedance of the second data terminal becomes normal. As shown in FIG. 5, the power supply circuit is automatically restarted at a first time point T1, a second time point T2, a third time point T3, a fourth time point T4, and a fifth time point T5, the power is supplied to the Vbus pin during the specified time period (e.g., about 30 ms to about 60 ms), and the power is not supplied to the Vbus pin between the first time point T1 and the second time point T2, between the second time point T2 and the third time point T3, between the third time point T3 and the fourth time point T4, and between the fourth time point T4 and the fifth time point T5.

According to an embodiment, when the voltage across the first data terminal (e.g., the D+ pin 212) of the connector is not dropped below the specified level (e.g., about 0.3 volts) or the impedance is not equal to or smaller than (i.e., greater than) the specified value (e.g., about 300 ohm), the electronic device (e.g., the second charging interface 250) may supply the power to the external electronic device (e.g., the electronic device 100) in operation 470. For instance, the power supply circuit may supply the power to the Vbus pin.

Figure 6:
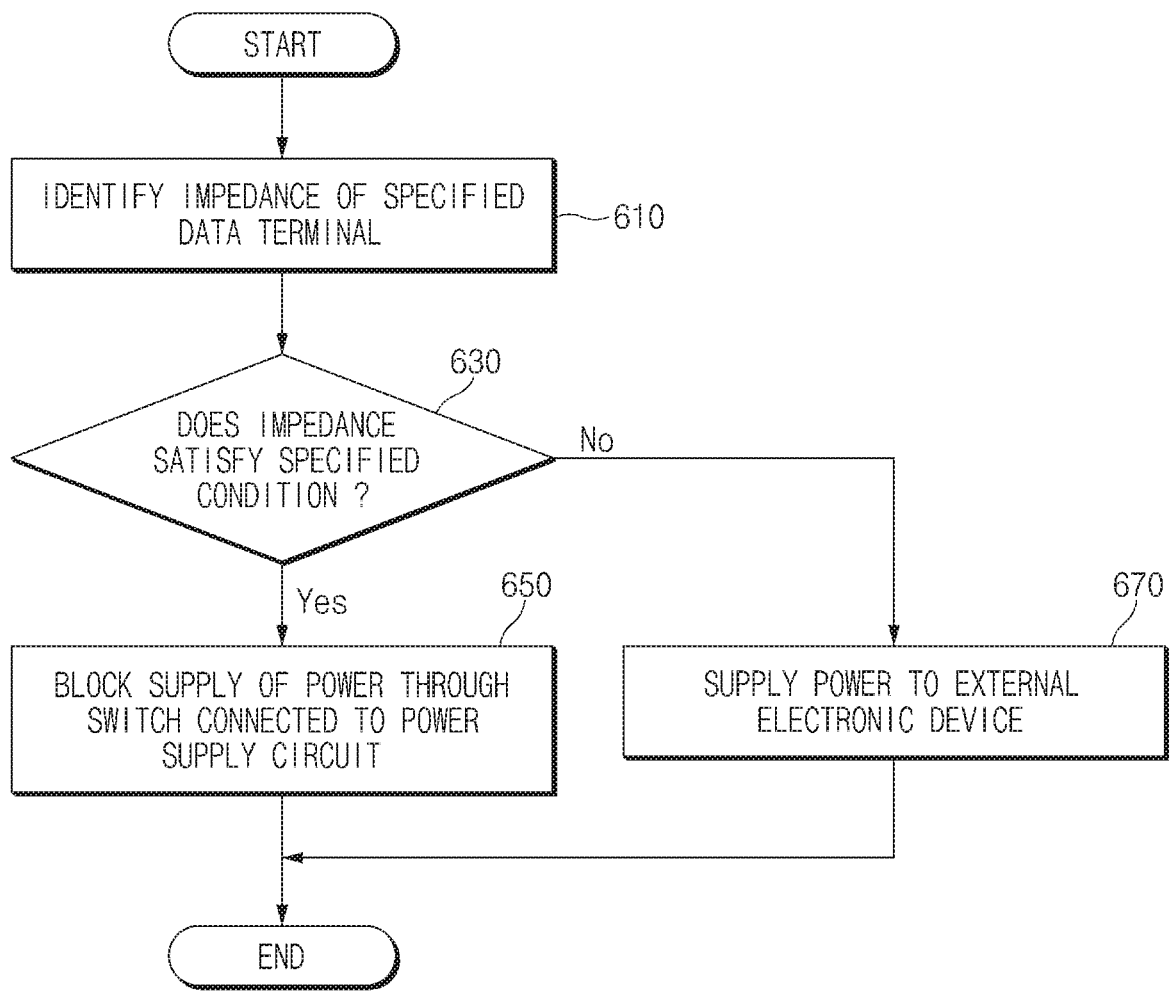
FIG. 6 is a flowchart showing an operation method of an electronic device to block a power supplied to an external electronic device according to an embodiment.
Figure 7:
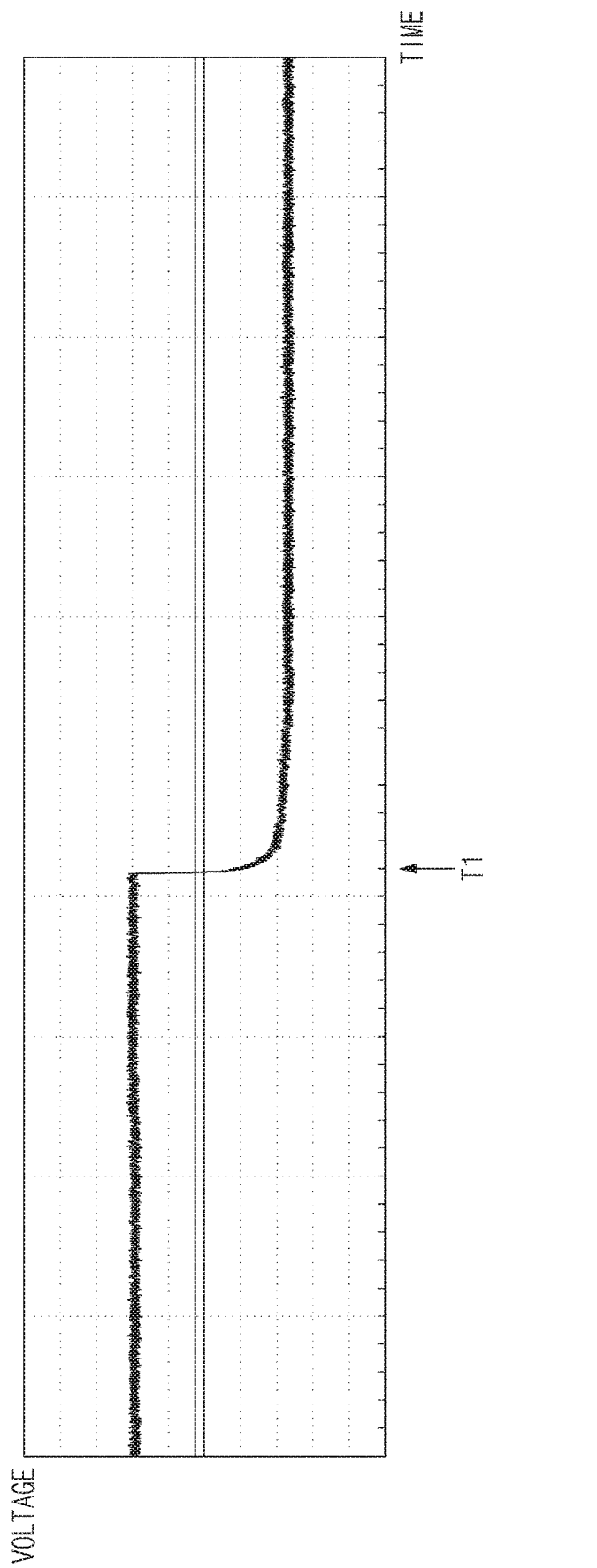
FIG. 7 is a graph showing a variation of a voltage due to a block of a power supplied to an external electronic device according to an embodiment.

FIG. 6 is a flowchart showing an operation method of an electronic device to block a power supplied to an external electronic device according to an embodiment, and FIG. 7 is a graph showing a variation of a voltage due to a block of a power supplied to an external electronic device according to an embodiment.

In FIGS. 6 and 7, the method for blocking the supply of the power to the external electronic device, which is different from the method for controlling the supply of the power to the external electronic device described with reference to FIGS. 4 and 5, will be described. In the following descriptions, the same or similar operations as the above-mentioned operations will be omitted.

Referring to FIGS. 6 and 7, when the voltage across the first data terminal (e.g., the D+ pin 212) of the connector (e.g., the second connector 210) is equal to or smaller than the specified level (e.g., about 0.3 volts), the electronic device (e.g., the power supply device 200) may identify the impedance of the specified data terminal (e.g., the D– pin 213) in operation 610.

In operation 630, the electronic device (e.g., the second charging interface 250) may determine whether the impedance of the specified data terminal satisfies the specified condition. As an example, the electronic device may determine whether the impedance is equal to or smaller than the specified value (e.g., about 300 ohm).

When the impedance satisfies the specified condition (e.g., when the impedance is equal to or smaller than the specified value), the electronic device (e.g., the second charging interface 250) may block the power supplied to the external device (e.g., the electronic device 100) using the switch (e.g., the switch 270) connected to the power supply circuit (e.g., the power supply circuit 230) in operation 650. For instance, the charging interface may block the power supplied to the Vbus pin (e.g., the Vbus pin 211) of the connector from the power supply circuit using the switch, and thus the power supplied to the external electronic device may be blocked.

According to an embodiment, the charging interface may maintain the switch in an off state until the voltage across the first data terminal returns to a normal value (e.g., about 5 volts).

FIG. 7 shows a graph showing the voltage due to the block of the power supplied to the external electronic device (e.g., the electronic device 100) when the charging interface turns off the switch. Referring to FIG. 7, when the impedance of the second data terminal of the connector is equal to or smaller than the specified value, the charging interface may turn off the switch to block the charge voltage from the power supply circuit. As shown in FIG. 7, the switch may be turned off at a first time point T1, and the charge voltage supplied to the external electronic device (e.g., the electronic device 100) may be blocked.

According to an embodiment, when the voltage across the first data terminal (e.g., the D+ pin 212) of the connector is not dropped below the specified level (e.g., about 0.3 volts) or the impedance is not equal to or smaller than (i.e., greater than) the specified value (e.g., about 300 ohm), the electronic device (e.g., the second charging interface 250) may supply the power to the external electronic device (e.g., the electronic device 100) in operation 670. For instance, the charging interface may turn on the switch such that the power supply circuit is connected to the Vbus pin.

As described above, according to various embodiments, the method for changing the impedance of the terminal included in the connector of the electronic device (e.g., the power supply device 200) including the connector (e.g., the second connector 210) including the plurality of terminals may include measuring the impedance corresponding to the second data terminal (e.g., the D− pin 213) among the terminals when the voltage across the first data terminal (e.g., the D+ pin 212) among the terminals is changed from the first voltage to the second voltage and controlling the power supplied to the power supply terminal among the terminals from the power supply circuit included in the electronic device when the impedance satisfies the specified condition.

According to various embodiments, the method may further include determining that the impedance satisfies the specified condition when the impedance is equal to or smaller than the specified value.

According to various embodiments, the controlling of the power may include restarting the power supply circuit at the specified time intervals when the impedance satisfies the specified condition.

According to various embodiments, the method may further include remeasuring the impedance corresponding to the second data terminal at the specified time point.

According to various embodiments, the method may further include allowing the power supply circuit to supply the power to the power supply terminal when the remeasured impedance does not satisfy the specified condition.

According to various embodiments, the controlling of the power may include turning off the switch (e.g., the switch 270) placed between the power supply circuit and the power supply terminal to release the connection between the power supply circuit and the power supply terminal when the impedance satisfies the specified condition.

According to various embodiments, the method may further include remeasuring the impedance corresponding to the second data terminal among the terminals when the voltage across the first data terminal among the terminals is changed to the first voltage after the switch is turned off.

According to various embodiments, the method may further include turning on the switch to connect the power supply circuit and the power supply terminal when the remeasured impedance does not satisfy the specified condition.

Figure 8:
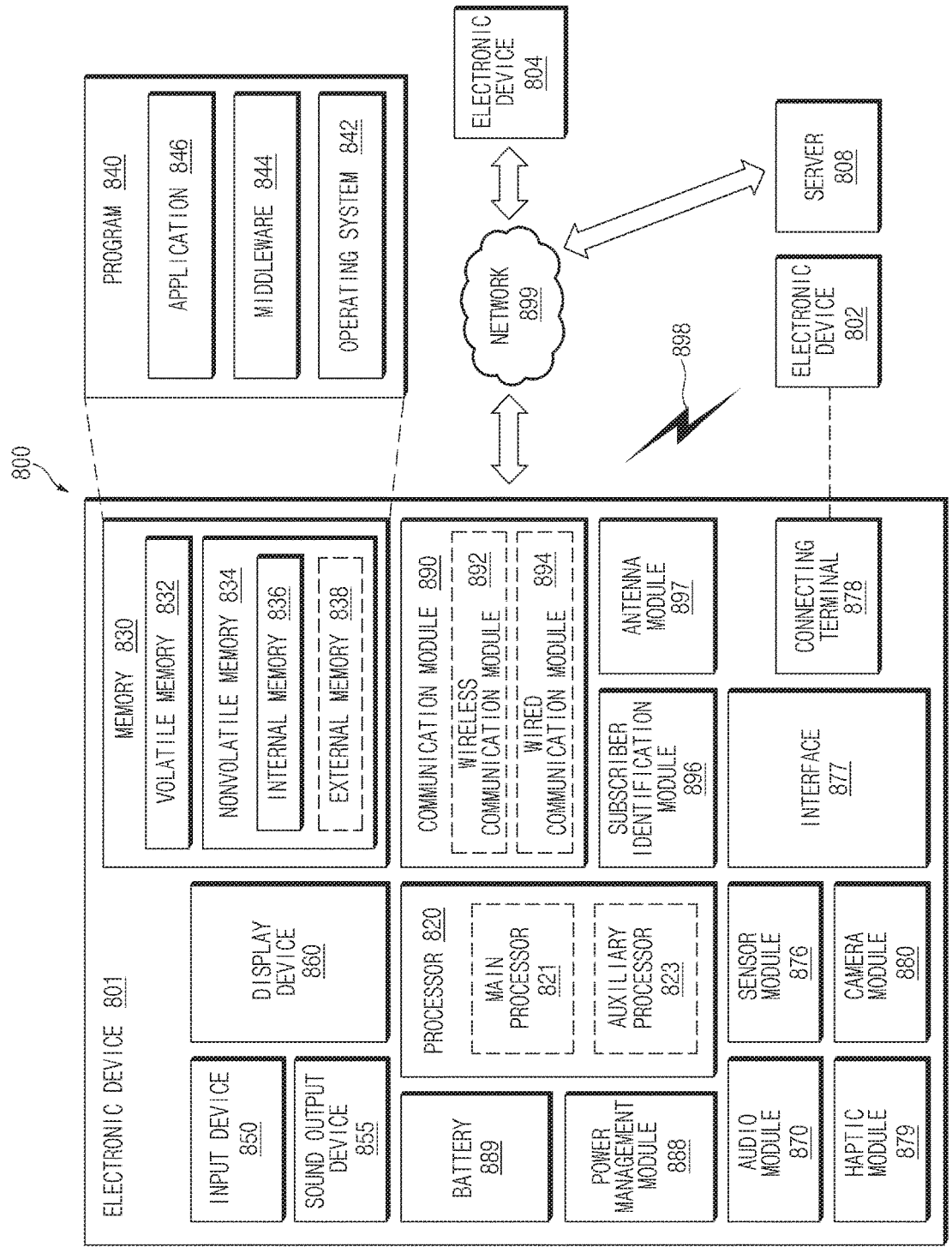
FIG. 8 is a block diagram showing an electronic device in a network environment according to various embodiments.

FIG. 8 is a block diagram showing an electronic device 801 (e.g., the electronic device 100 shown in FIG. 1) in a network environment 800 according to various embodiments. Referring to FIG. 8, the electronic device 801 may communicate with an electronic device 802 via a first network 898 (e.g., a short-range wireless communication) or may communicate with an electronic device 804 or a server 808 via a second network 899 (e.g., a long-distance wireless communication) in the network environment 800. According to an embodiment, the electronic device 801 may communicate with the electronic device 804 via the server 808. According to an embodiment, the electronic device 801 may include a processor 820, a memory 830, an input device 850, a sound output device 855, a display device 860, an audio module 870, a sensor module 876, an interface 877, a haptic module 879, a camera module 880, a power management module 888, a battery 889, a communication module 890, a subscriber identification module 896, and an antenna module 897. According to an embodiment, at least one component (e.g., the display device 860 or the camera module 880) among the components of the electronic device 801 may be omitted, or other components may be added to the electronic device 801. According to an embodiment, some components may be integrated and implemented as in the case of the sensor module 876 (e.g., a fingerprint sensor, an iris sensor, or an illuninance sensor) embedded in the display device 860 (e.g., a display).

The processor 820 may operate, for example, software (e.g., a program 840) to control at least one of other components (e.g., hardware or software components) of the electronic device 801 connected to the processor 820 and may process and compute a variety of data. The processor 820 may load an instruction or data, which is received from other components (e.g., the sensor module 876 or the communication module 890), into a volatile memory 832, may process the loaded instruction or data, and may store result data into a nonvolatile memory 834. According to an embodiment, the processor 820 may include a main processor 821 (e.g., a central processing unit or an application processor) and an auxiliary processor 823 (e.g., a graphic processing device, an image signal processor, a sensor hub processor, or a communication processor), which operates independently from the main processor 821, additionally or alternatively, uses less power than the main processor 821, or is specified to a designated function. In this case, the auxiliary processor 823 may operate separately from the main processor 821 or may be embedded into the main processor 821.

In this case, the auxiliary processor 823 may control, for example, at least some of functions or states associated with at least one component (e.g., the display device 860, the sensor module 876, or the communication module 890) among the components of the electronic device 801 instead of the main processor 821 while the main processor 821 is in an inactive (e.g., sleep) state or together with the main processor 821 while the main processor 821 is in an active (e.g., an application execution) state. According to an embodiment, the auxiliary processor 823 (e.g., the image signal processor or the communication processor) may be implemented as a part of another component (e.g., the camera module 880 or the communication module 890) that is functionally related to the auxiliary processor 823.

The memory 830 may store a variety of data used by at least one component (e.g., the processor 820 or the sensor module 876) of the electronic device 801, for example, software (e.g., the program 840) and input data or output data with respect to instructions associated with the software. The memory 830 may include the volatile memory 832 or the nonvolatile memory 834.

The program 840 may be stored in the memory 830 as software and may include, for example, an operating system 842, a middleware 844, or an application 846.

The input device 850 may be a device for receiving an instruction or data, which is used for a component (e.g., the processor 820) of the electronic device 801, from an outside (e.g., a user) of the electronic device 801 and may include, for example, a microphone, a mouse, or a keyboard.

The sound output device 855 may be a device for outputting a sound signal to the outside of the electronic device 801 and may include, for example, a speaker used for general purposes, such as multimedia play or recordings play, and a receiver used only for receiving calls. According to an embodiment, the receiver and the speaker may be either integrally or separately implemented.

The display device 860 may be a device for visually presenting information to the user and may include, for example, a display, a hologram device, or a projector and a control circuit for controlling a corresponding device. According to an embodiment, the display device 860 may include a touch circuitry or a pressure sensor for measuring an intensity of pressure on the touch.

The audio module 870 may convert a sound and an electrical signal in dual directions. According to an embodiment, the audio module 870 may obtain the sound through the input device 850 or may output the sound through the sound output device 855 or an external electronic device (e.g., the electronic device 802 (e.g., a speaker or a headphone)) wired or wirelessly connected to the electronic device 801.

The sensor module 876 may generate an electrical signal or a data value corresponding to an operating state (e.g., power or temperature) inside or an environmental state outside the electronic device 801. The sensor module 876 may include, for example, a gesture sensor, a gyro sensor, a pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 877 may support a designated protocol wired or wirelessly connected to the external electronic device (e.g., the electronic device 802). According to an embodiment, the interface 877 may include, for example, an HDMI (high-definition multimedia interface), a USB (universal serial bus) interface, an SD card interface, or an audio interface.

A connection terminal 878 may include a connector that physically connects the electronic device 801 to the external electronic device (e.g., the electronic device 802), for example, an HDMI connector, a USB connector, an SD card connector, or an audio connector (e.g., a headphone connector).

The haptic module 879 may convert an electrical signal to a mechanical stimulation (e.g., vibration or movement) or an electrical stimulation perceived by the user through tactile or kinesthetic sensations. The haptic module 879 may include, for example, a motor, a piezoelectric device, or an electric stimulator.

The camera module 880 may take a still image or a video image. According to an embodiment, the camera module 880 may include, for example, at least one lens, an image sensor, an image signal processor, or a flash.

The power management module 888 may be a module for managing power supplied to the electronic device 801 and may serve as at least a part of a power management integrated circuit (PMIC).

The battery 889 may be a device for supplying power to at least one component of the electronic device 801 and may include, for example, a non-rechargeable (primary) battery, a rechargeable (secondary) battery, or a fuel cell.

The communication module 890 may establish a wired or wireless communication channel between the electronic device 801 and the external electronic device (e.g., the electronic device 802, the electronic device 804, or the server 808) and support communication execution through the established communication channel. The communication module 890 may include at least one communication processor operating independently from the processor 820 (e.g., the application processor) and supporting the wired communication or the wireless communication. According to an embodiment, the communication module 890 may include a wireless communication module 892 (e.g., a cellular communication module, a short-range wireless communication module, or a GNSS (global navigation satellite system) communication module) or a wired communication module 894 (e.g., an LAN (local area network) communication module or a power line communication module) and may communicate with the external electronic device using a corresponding communication module among them through the first network 898 (e.g., the short-range communication network such as a Bluetooth, a WiFi direct, or an IrDA (infrared data association)) or the second network 899 (e.g., the long-distance communication network such as a cellular network, an internet, or a computer network (e.g., an LAN or a WAN)). The above-mentioned various communication modules 890 may be implemented into one chip or into separate chips, respectively.

According to an embodiment, the wireless communication module 892 may identify and authenticate the electronic device 801 using user information stored in the subscriber identification module 896 in the communication network.

The antenna module 897 may include one or more antennas to transmit or receive the signal or power to or from an external source. According to an embodiment, the communication module 890 (e.g., the wireless communication module 892) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., an instruction or data) with each other.

According to an embodiment, the instruction or data may be transmitted or received between the electronic device 801 and the external electronic device 804 through the server 808 connected to the second network 899. Each of the electronic devices 802 and 804 may be the same or different types as or from the electronic device 801. According to an embodiment, all or some of the operations performed by the electronic device 801 may be performed by another electronic device or a plurality of external electronic devices. When the electronic device 801 performs some functions or services automatically or by request, the electronic device 801 may request the external electronic device to perform at least some of the functions related to the functions or services, in addition to or instead of performing the functions or services by itself. The external electronic device receiving the request may carry out the requested function or the additional function and transmit the result to the electronic device 801. The electronic device 801 may provide the requested functions or services based on the received result as is or after additionally processing the received result. To this end, for example, a cloud computing, distributed computing, or client-server computing technology may be used.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 840) including an instruction stored in a machine-readable storage media (e.g., an internal memory 836 or an external memory 838) readable by a machine (e.g., a computer). The machine may be a device that calls the instruction from the machine-readable storage media and operates depending on the called instruction and may include the electronic device (e.g., the electronic device 801). When the instruction is executed by the processor (e.g., the processor 820), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed through an application store (e.g., a Play Store™) In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a connector including a plurality of terminals for electrically connecting to a power supply device supplying a power to the electronic device; and
   a control circuit, the control circuit being configured to:
      sense moisture entering the connector;
      change an impedance of at least one specified data terminal among the terminals in response to the sensing of the moisture for having the external power supply device, when connected via the connector, identify the impedance of the at least one specified data terminal and change a level of a voltage depending on the impedance; and
      receive the voltage whose level is changed from the power supply device,
   wherein the control circuit is configured to pull down the impedance of the at least one specified data terminal below a specified value in response to the sensing of the moisture, and
   wherein the received power has a magnitude corresponding to a voltage lower than a decomposition starting voltage upon pulling down the impedance of the at least one specified data terminal below the specified value.

2. The electronic device of claim 1, wherein the specified value is about 10 ohms.

3. The electronic device of claim 1, wherein the control circuit is configured to:
sense the moisture entering the connector after a specified time period; and
change the impedance of the at least one specified data terminal to a previous state when no moisture is sensed.

4. An electronic device comprising:
a power supply circuit:
a connector including a plurality of terminals for electrically connecting to an external electronic device via an external connector comprised in the external electronic device to supply a power to the external electronic device from the electronic device; and
a control circuit, the control circuit being configured to:
measure an impedance corresponding to a second data terminal among the terminals when a voltage across a first data terminal among the terminals is changed from a first voltage to a second voltage by the external electronic device in response to sensing, by the external electronic device, of moisture entering the external connector; and
control the power supplied to a power supply terminal among the terminals from the power supply circuit when the impedance satisfies a specified condition,
wherein power provided to the external electronic device has a level for preventing corrosion of the external connector when current flows through the external connector while moisture is present in the external connector.

5. The electronic device of claim 4, wherein the control circuit is configured to determine that the impedance satisfies the specified condition when the impedance is equal to or smaller than a specified value.

6. The electronic device of claim 4, wherein the control circuit is configured to restart the power supply circuit at specified time intervals when the impedance satisfies the specified condition.

7. The electronic device of claim 6, wherein the control circuit is configured to remeasure the impedance corresponding to the second data terminal at a specified time point.

8. The electronic device of claim 7, wherein the control circuit is configured to allow the power supply circuit to supply the power to the power supply terminal when the remeasured impedance does not satisfy the specified condition.

9. The electronic device of claim 4, further comprising a switch placed between the power supply circuit and the power supply terminal, wherein the control circuit is configured to turn off the switch such that a connection between the power supply circuit and the power supply terminal is released when the impedance satisfies the specified condition.

10. The electronic device of claim 9, wherein the control circuit is configured to remeasure the impedance corresponding to the second data terminal among the terminals when the voltage across the first data terminal among the terminals is changed to the first voltage after the switch is turned off.

11. The electronic device of claim 10, wherein the control circuit is configured to turn on the switch such that the power supply circuit is connected to the power supply terminal when the remeasured impedance does not satisfy the specified condition.

12. A method for changing an impedance of a terminal included in a connector of an electronic device comprising the connector with a plurality of terminals, the method comprising:
measuring the impedance corresponding to a second data terminal among the terminals when a voltage across a first data terminal among the terminals is changed from a first voltage to a second voltage by an external electronic device in response to sensing, by the external electronic device, of moisture entering an external connector comprised in the external electronic device connected to the connector; and
controlling a power supplied to a power supply terminal among the terminals from a power supply circuit included in the electronic device when the impedance satisfies a specified condition,
wherein power provided to the external electronic device has a level for preventing corrosion of the external connector when current flows through the external connector while moisture is present in the external connector, and the provided power has a magnitude corresponding to a voltage lower than a decomposition starting voltage.

13. The method of claim 12, further comprising determining that the impedance satisfies the specified condition when the impedance is equal to or smaller than a specified value.

14. The method of claim 12, wherein the controlling of the power includes restarting the power supply circuit at specified time intervals when the impedance satisfies the specified condition.

* * * * *